(12) United States Patent
Teramura et al.

(10) Patent No.: US 8,950,262 B2
(45) Date of Patent: Feb. 10, 2015

(54) DEVICE FOR MEASURING SOUND SOURCE DISTRIBUTION IN THREE-DIMENSIONAL SPACE

(75) Inventors: Minoru Teramura, Wako (JP); Yuichi Fukuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 408 days.

(21) Appl. No.: 13/505,869

(22) PCT Filed: Nov. 1, 2010

(86) PCT No.: PCT/JP2010/069406
§ 371 (c)(1),
(2), (4) Date: May 3, 2012

(87) PCT Pub. No.: WO2011/058899
PCT Pub. Date: May 19, 2011

(65) Prior Publication Data
US 2012/0216619 A1 Aug. 30, 2012

(30) Foreign Application Priority Data
Nov. 10, 2009 (JP) .................................. 2009-256698

(51) Int. Cl.
*G01M 9/06* (2006.01)
*G01H 9/00* (2006.01)
*G01M 17/007* (2006.01)
*G01P 3/80* (2006.01)

(52) U.S. Cl.
CPC .............. *G01M 9/067* (2013.01); *G01H 9/002* (2013.01); *G01M 17/007* (2013.01); *G01P 3/806* (2013.01)
USPC ............................... 73/645; 73/147; 382/107

(58) Field of Classification Search
USPC .......................................................... 73/645
See application file for complete search history.

(56) References Cited

U.S. PATENT DOCUMENTS

5,249,238 A * 9/1993 Komerath et al. ............ 382/107

FOREIGN PATENT DOCUMENTS

| JP | 61-029729 | 2/1986 |
|----|-----------|--------|
| JP | 2004-020385 | 1/2004 |
| JP | 2004-286733 | 10/2004 |
| JP | 2005-003368 | 1/2005 |
| JP | 2007-033306 | 2/2007 |
| JP | 2008-064692 | 3/2008 |

* cited by examiner

*Primary Examiner* — John Chapman, Jr.
(74) *Attorney, Agent, or Firm* — Rankin, Hill & Clark LLP (57) ABSTRACT

A device for measuring a sound source distribution in three-dimensional space is provided in which tracer particles included around an object are irradiated with a two-dimensional laser sheet within an x-y plane at two times separated by a short time interval, images of the irradiated tracer particles are taken, and two in-plane velocity components of the tracer particles in the laser sheet and one out-of-plane velocity component perpendicular to the laser sheet are measured based on the images taken. Further, the velocity field of the three velocity components in three-dimensional space is measured by obtaining three velocity components within a plurality of planes spaced apart in a z-axis direction perpendicular to the laser sheet and stacking the three velocity components within the plurality of planes in the z-axis direction. The sound source distribution around the object is measured from the velocity field.

4 Claims, 8 Drawing Sheets

DEVICE FOR MEASURING SOUND SOURCE
DISTRIBUTION IN THREE-DIMENSIONAL
SPACE

TECHNICAL FIELD

The present invention relates to a device for measuring a sound source distribution in three-dimensional space, the device measuring a sound source distribution of a velocity field in three-dimensional space around an object with good precision.

BACKGROUND ART

An arrangement in which a dipole sound source distribution is determined by setting a predetermined finite computational domain as a range for which a velocity vector in a flow field is calculated by particle image velocimetry (PIV: Particle Image Velocimetry), replacing the influence of a vortex outside this computational domain by the influence of a vortex within the domain, and then using an equation obtained by combining Howe's equation and a compact Green's function adapted to an object's shape, is known from Patent Document 1 below.

Furthermore, an arrangement in which a velocity vector of a flow field is computed by particle image velocimetry based on an image taken of a site to be measured, a sound pressure of the site to be measured is measured by a microphone, and a sound source distribution map is computed by cross-correlation calculation between the velocity vector and the sound pressure, is known from Patent Document 2 below.

RELATED ART DOCUMENTS

Patent Documents

Patent Document 1: Japanese Patent Application Laid-open No. 2005-3368
Patent Document 2: Japanese Patent Application Laid-open No. 2008-64692

SUMMARY OF THE INVENTION

Problems to be Solved by the Invention

However, although the arrangement described in Patent Document 1 above enables a three-dimensional aerodynamic sound source distribution to be obtained from a known stereo PIV system, there is the problem that the known stereo PIV system can only determine a two-dimensional three-component velocity field, and a complex sound source distribution of a three-dimensional flow field around a three-dimensional object cannot be determined with good precision.

Furthermore, the arrangement described in Patent Document 2 above not only requires a microphone for sound source identification in addition to a particle image velocimetry system but also has the problem that a sound source distribution map that is obtained only has a level of precision that can estimate the position of the sound source, and in the same way as above a complex sound source distribution of a three-dimensional flow field around a three-dimensional object cannot be determined with good precision.

The present invention has been accomplished in light of the above-mentioned circumstances, and it is an object thereof to measure a sound source distribution of a velocity field in three-dimensional space around an object.

Means for Solving the Problems

In order to attain the above object, according to a first aspect of the present invention, there is provided a device for measuring a sound source distribution in three-dimensional space, the device comprising: a particle image velocimetry system that irradiates, with laser light, tracer particles included in a flow field around an object at two times that are separated by a very short period of time, and measures a velocity field of three velocity components in three-dimensional space from images at the two times of the tracer particles irradiated with the laser light taken by imaging means; and sound source distribution measuring means that measures a sound source distribution around the object from the velocity field of the three three-dimensional velocity components.

Further, according to a second aspect of the present invention, in addition to the first aspect, the particle image velocimetry system irradiates tracer particles in the flow field with a two-dimensional laser sheet, obtains the three velocity components within a plurality of planes while moving the laser sheet, and measures the velocity field by stacking the three velocity components within the plurality of planes with the flow as a steady flow.

Furthermore, according to a third aspect of the present invention, in addition to the second aspect, the particle image velocimetry system comprises laser sheet irradiating means and the imaging means supported on a moving member that can be moved along a guide member disposed in a direction parallel to a laser beam that forms the laser sheet, the laser sheet irradiating means and the imaging means being moved while maintaining a fixed positional relationship.

Moreover, according to a fourth aspect of the present invention, in addition to any one of the first to third aspects, the sound source distribution measuring means measures a sound source distribution around the object from the velocity field of the three three-dimensional velocity components based on the Proudman theorem.

A main guide rail 21 and an auxiliary guide rail 22 of an embodiment correspond to the guide member of the present invention, a main traverser 23 and first and second auxiliary traversers 24A and 24B of the embodiment correspond to the moving member of the present invention, first and second CCD cameras 32A and 32B of the embodiment correspond to the imaging means of the present invention, and one out-of-plane velocity component w and two in-plane velocity components u and v of the embodiment correspond to the velocity component of the present invention.

Effects of the Invention

In accordance with the first aspect of the present invention, when the particle image velocimetry system irradiates tracer particles included in the flow field around the object with laser light at two times that are separated by a very short period of time, and measures the velocity field of the three velocity components in three-dimensional space from images of tracer particles irradiated with laser light taken at the two times by the imaging means, since the sound source distribution measuring means measures the sound source distribution around the object from the velocity field of the three three-dimensional velocity components, it is possible to measure the sound source distribution in three-dimensional space with good precision.

Furthermore, in accordance with the second aspect of the present invention, obtaining the three velocity components within the plurality of planes while moving the two-dimensional laser sheet irradiating tracer particles in the flow field around the object and stacking the three velocity components within the plurality of planes with the flow as a steady flow enables the three velocity components of the velocity field in three-dimensional space around the object to be measured.

Moreover, in accordance with the third aspect of the present invention, since the laser sheet irradiating means and the imaging means are supported on the moving member that can be moved along the guide member disposed in a direction parallel to the laser beam that forms the laser sheet, and the laser sheet irradiating means and the imaging means are moved while maintaining a fixed positional relationship, when moving the position of the laser sheet in order to measure the velocity field of the three velocity components in three-dimensional space, it is possible to eliminate the necessity for carrying out calibration each time, thereby reducing the number of calibration steps.

Furthermore, in accordance with the fourth aspect of the present invention, since the sound source distribution measuring means measures the sound source distribution around the object from the velocity field of the three three-dimensional velocity components based on the Proudman theorem, it is possible to measure the sound source distribution in three-dimensional space with good precision.

EXPLANATION OF REFERENCE NUMERALS AND SYMBOLS

12 Object
15 Particle image velocimetry system
16 Sound source distribution measuring means
21 Main guide rail (guide member)
22 Auxiliary guide rail (guide member)
23 Main traverser (moving member)
24A First auxiliary traverser (moving member)
24B Second auxiliary traverser (moving member)
31 Laser sheet irradiating means
32A First CCD camera (imaging means)
32B Second CCD camera (imaging means)
Lb Laser beam
Ls Laser sheet
u, v Two in-plane velocity components (velocity component)
w One out-of-plane velocity component (velocity component)

Mode For Carrying Out the Invention

A mode for carrying out the present invention is explained below by reference to FIG. 1 to FIG. 8.

First Embodiment

Figure 1:
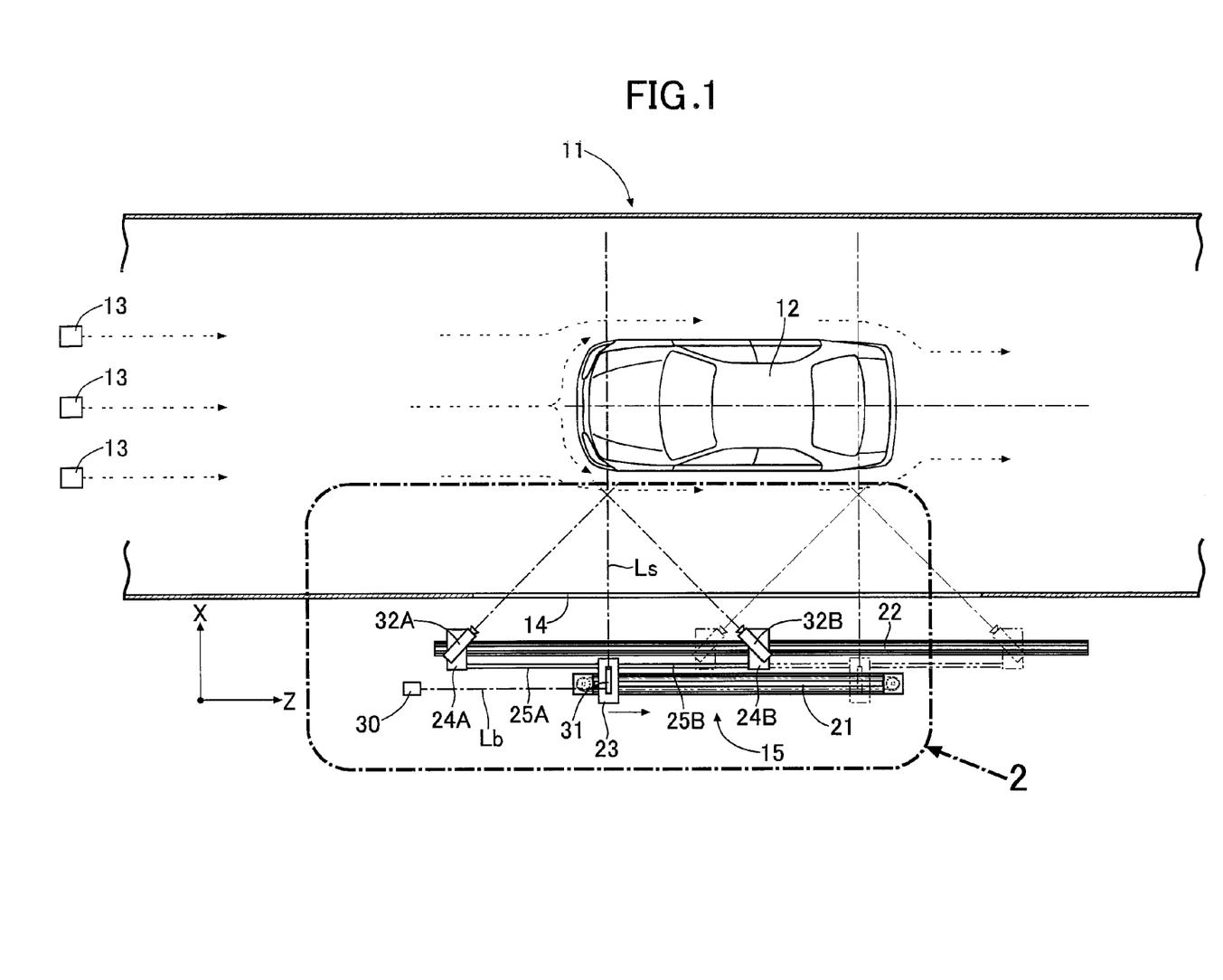
FIG. 1 is an overall plan view of a particle image velocimetry system provided in a wind tunnel. (first embodiment)

As shown in FIG. 1, an object 12 such as for example an automobile vehicle body model is placed in the interior of a wind tunnel 11 to which a uniform flow of air at a predetermined flow velocity is supplied, and fine oil droplets (tracer particles) having a diameter of a few µm are supplied into the uniform flow from tracer particle supply means 13 disposed on the upstream side of the object 12. The uniform flow changes its direction of flow along the surface of the object 12 and forms a three dimensional velocity field. A transparent observation window 14 is provided in at least part of a wall face of the wind tunnel 11, and a particle image velocimetry system 15 is disposed at a position facing the object 12 with the observation window 14 interposed therebetween.

Figure 2:
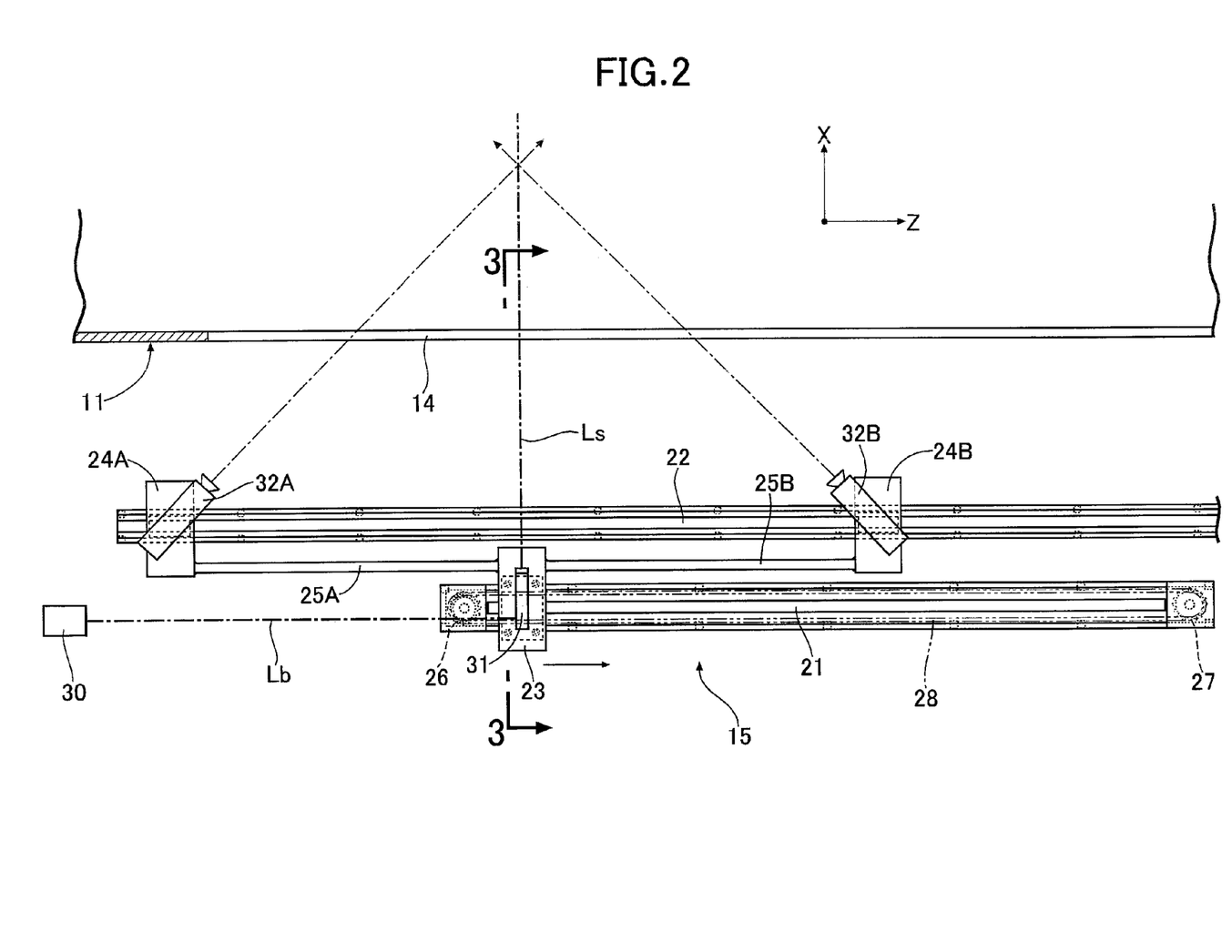
FIG. 2 is an enlarged view of part 2 in FIG. 1. (first embodiment)
Figure 3:
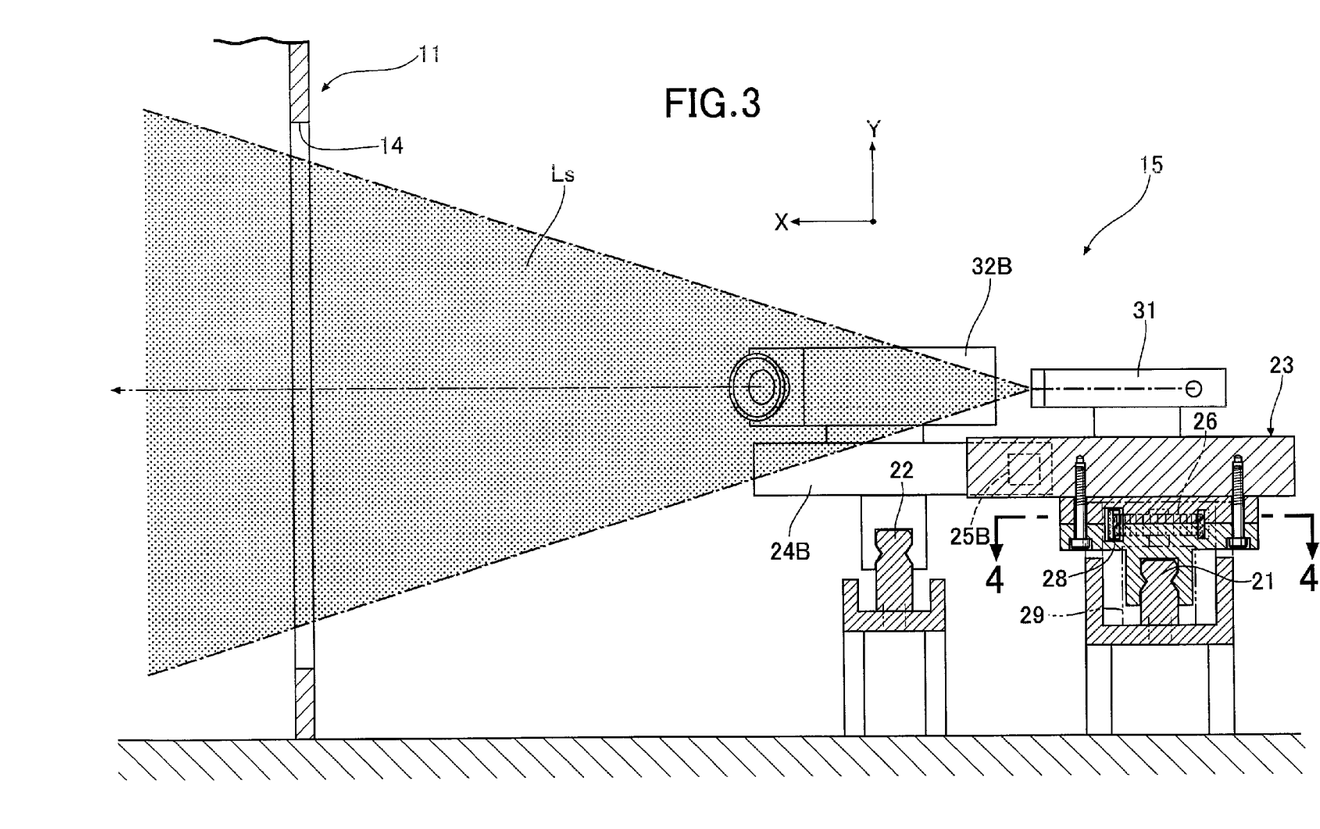
FIG. 3 is an enlarged sectional view along line 3-3 in FIG. 2. (first embodiment)
Figure 4:
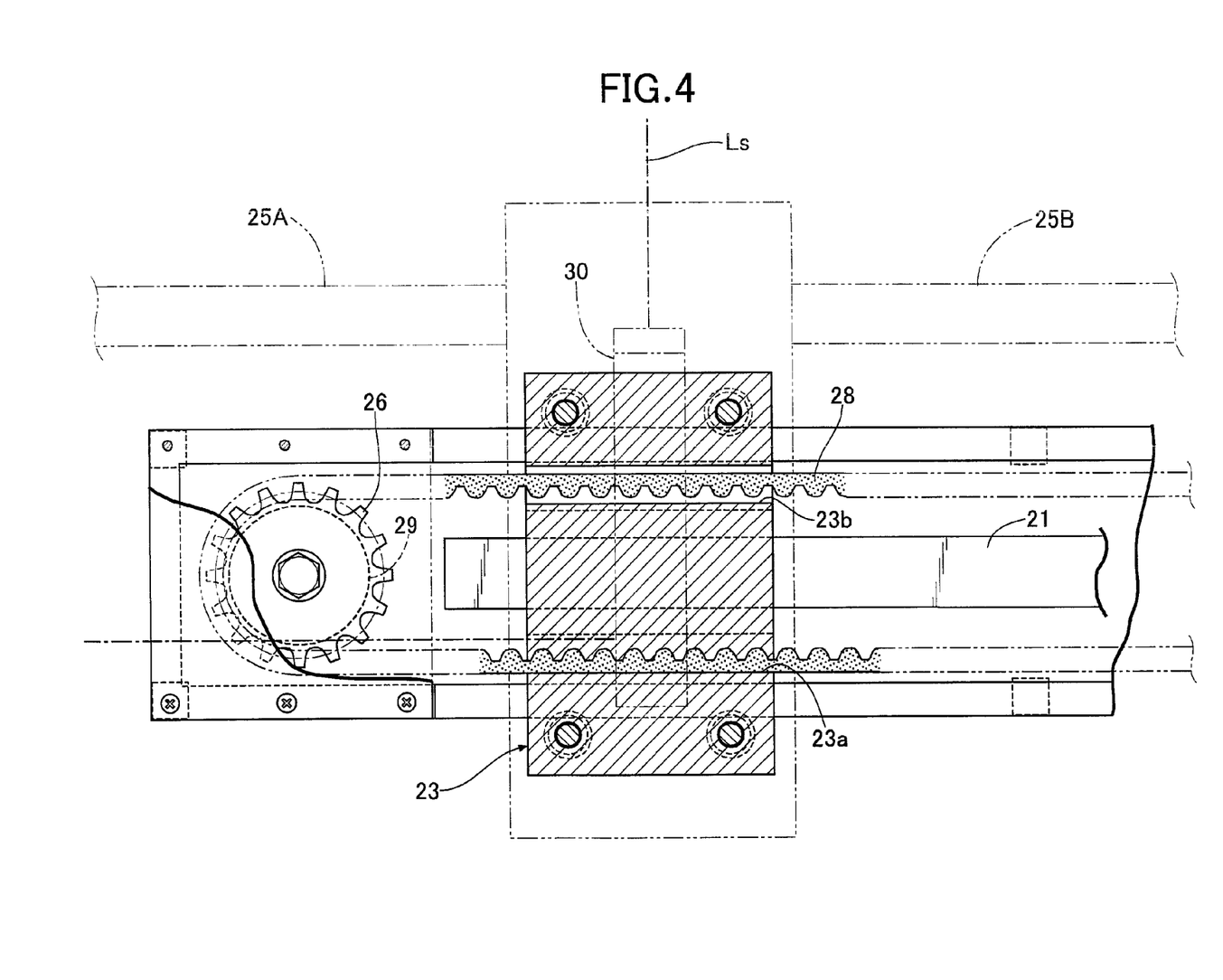
FIG. 4 is a sectional view along line 4-4 in FIG. 3. (first embodiment)
Figure 5:
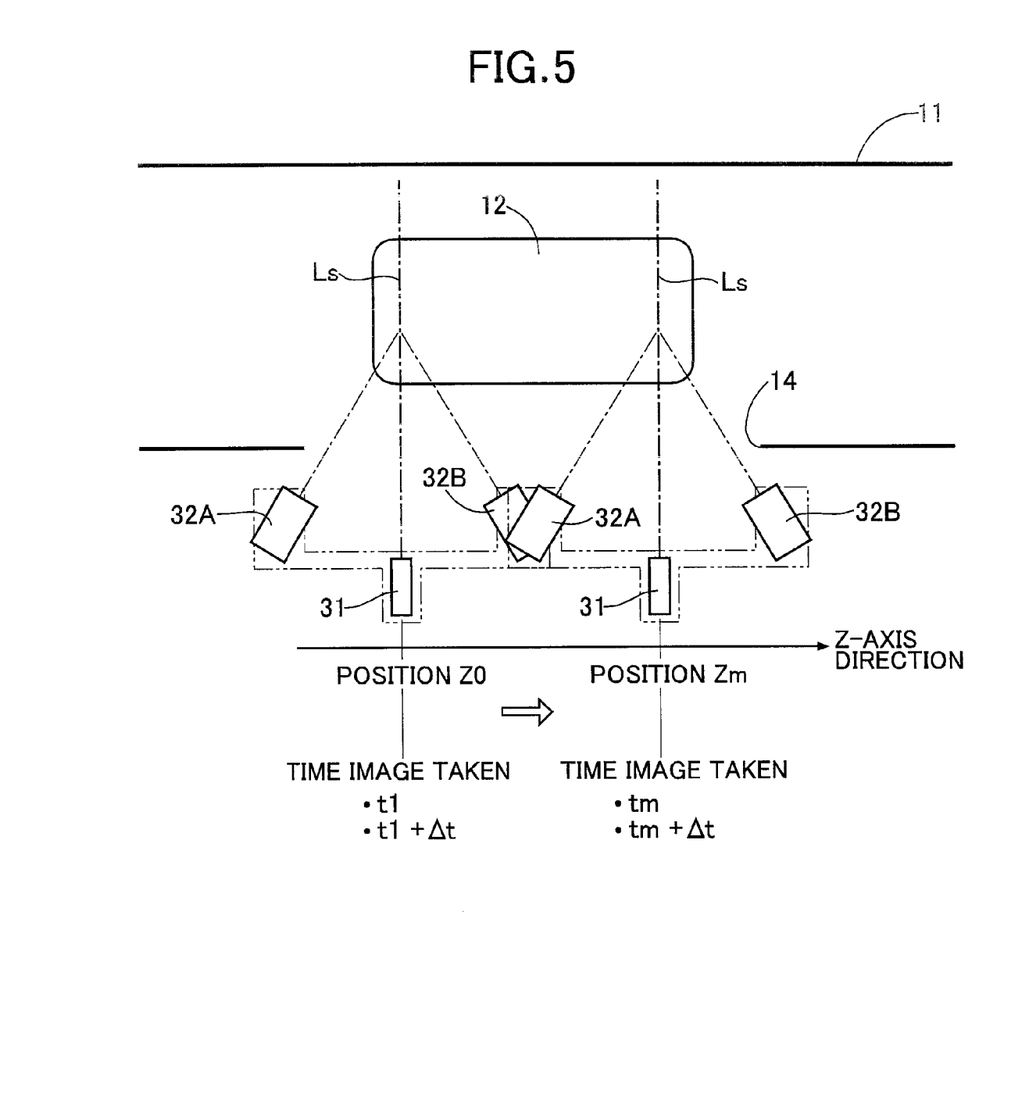
FIG. 5 is a diagram for explaining movement of a laser sheet and a CCD camera in the z-axis direction. (first embodiment)

As shown in FIG. 2 to FIG. 4, the particle image velocimetry system 15 includes a main guide rail 21 disposed parallel to the axis of the wind tunnel 11, an auxiliary guide rail 22 disposed parallel to the main guide rail 21, a main traverser 23 movably supported on the main guide rail 21 and a pair of first and second auxiliary traversers 24A and 24B movably supported on the auxiliary guide rail 22, a first link rod 25A linking the main traverser 23 and the first auxiliary traverser 24A, and a second link rod 25B linking the main traverser 23 and the second auxiliary traverser 24B, the first and second link rods 25A and 25B having the same length.

An endless timing belt 28 is wound around a drive sprocket 26 and a driven sprocket 27 provided at opposite ends of the main guide rail 21, one chord section of the endless timing belt 28 engages with one through hole 23a of the main traverser 23 (see FIG. 4) in a relatively non-movable manner, and another chord section passes through another through hole 23b of the main traverser 23 (see FIG. 4) in a non-engaged manner. When the drive sprocket 26 is driven by a motor 29 (see FIG. 3 and FIG. 4), the timing belt 28 wound between it and the driven sprocket 27 rotates, and the main traverser 23 moves along the main guide rail 21. When the main traverser 23 moves, the first and second auxiliary traversers 24A and 24B linked thereto via the first and second link rods 25A and 25B move along the auxiliary guide rail 22.

A laser head 30 is provided on an extension line from the main guide rail 21, and the laser head 30 shines a laser beam Lb along the main guide rail 21. Laser sheet irradiating means 31, which is formed from a mirror and a cylindrical lens, is provided on an upper face of the main traverser 23, the laser sheet irradiating means 31 converting the laser beam Lb into a laser sheet Ls with which a plane perpendicular to the laser beam Lb is irradiated. The axes of the laser beam Lb and the wind tunnel 11 extend in the z-axis direction, and the laser sheet Ls extends in the x-axis and y-axis directions, which are perpendicular to the z-axis direction.

First and second CCD cameras 32A and 32B are provided on upper faces of the first and second auxiliary traversers 24A and 24B respectively, the first and second CCD cameras 32A and 32B being disposed at mirror symmetrical positions with respect to the laser sheet Ls and directed to one point on the laser sheet Ls. The first and second CCD cameras 32A and 32B take an image of a predetermined region of the laser sheet Ls in the vicinity of the object 12, the first and second CCD cameras 32A and 32B being provided with a Scheimpflug adapter so that the entire area of the imaging region is focused. Since the main traverser 23 equipped with the laser sheet irradiating means 31 and the first and second auxiliary traversers 24A and 24B equipped with the first and second CCD cameras 32A and 32B move in the z-axis direction while maintaining a fixed positional relationship, the laser sheet Ls and the first and second CCD cameras 32A and 32B move in the z-axis direction while maintaining a fixed positional relationship.

The main traverser 23 and the first and second auxiliary traversers 24A and 24B move in the z-axis direction intermittently by a predetermined distance at a time, and each time they stop the laser sheet Ls is shone twice with a short time interval Δt. In the embodiment, they move a distance of 1 m in the z-axis direction intermittently at intervals of 10 cm (see FIG. 5, from Z0 to Zm). The larger the flow velocity of the uniform flow within the wind tunnel 11, the smaller the time interval Δt is set, and it is adjusted so that the distance of movement in the z-axis direction of the tracer particles during the time interval Δt is at a level that is suitable for measurement. Furthermore, the distance of movement in the z-axis direction of the tracer particles during the time interval Δt is set so that it does not exceed the thickness of the laser sheet Ls in the z-axis direction.

The uniform flow flowing in the interior of the wind tunnel 11 changes its direction around the object 12 and becomes a three-dimensional flow, and the tracer particles included therein also move along the line of flow of air. The first and second CCD cameras 32A and 32B take images of the tracer particles irradiated with the laser sheet Ls in synchronism with the first irradiation at time t1, thus acquiring two images from two directions of the tracer particles distributed within the irradiation plane. Similarly, the first and second CCD cameras 32A and 32B take images of the tracer particles irradiated with the laser sheet Ls in synchronism with the second irradiation at time t1'=t1+Δt, thus acquiring two images from two directions of the tracer particles distributed within the irradiation plane.

In the present embodiment, among various PIV methods, an 'image correlation method' is employed in which luminance patterns of two images acquired at the two times t1 and t1' are compared to determine the movement vector of a group of tracer particles.

Figure 6:
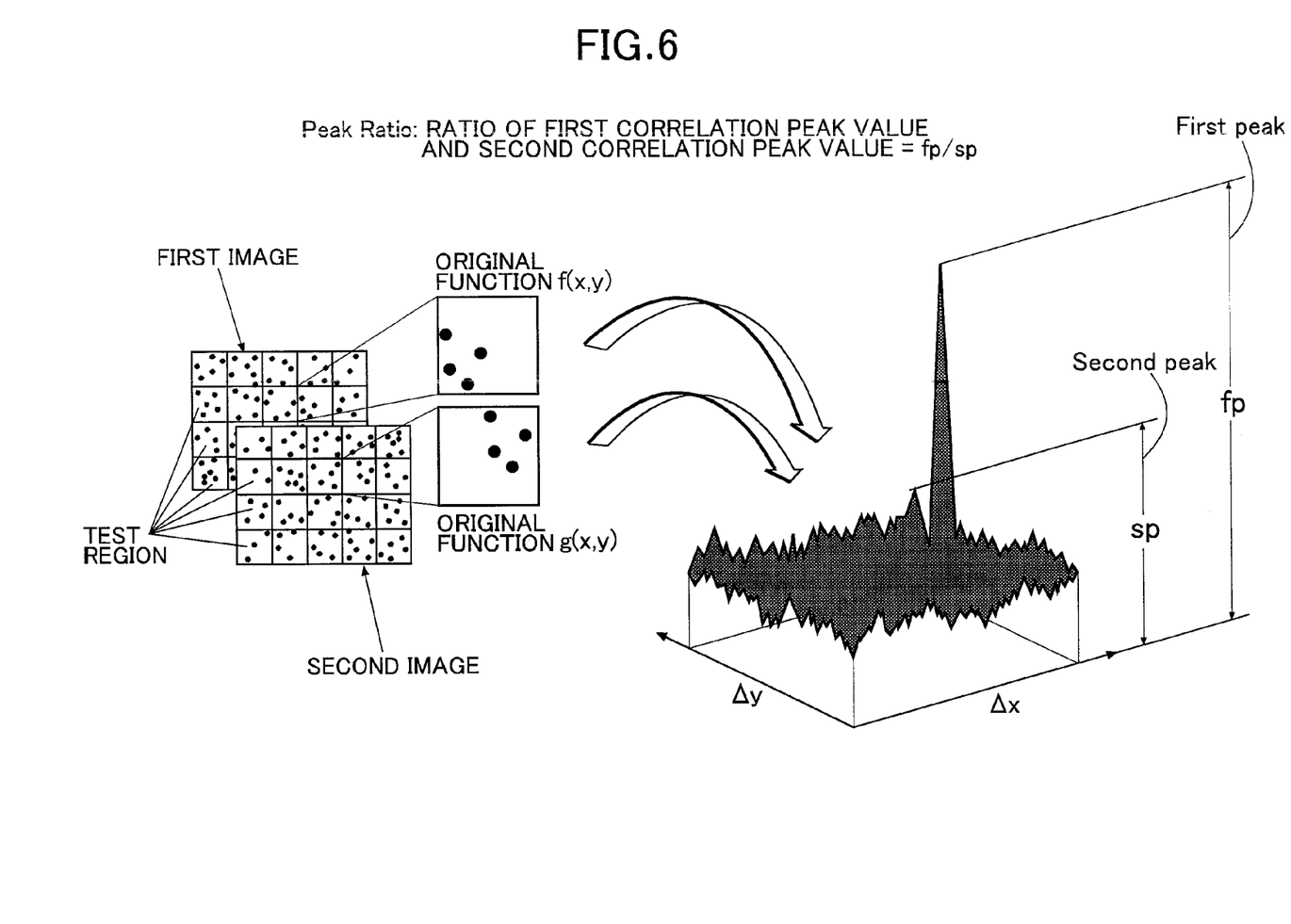
FIG. 6 is a diagram for explaining the process of calculating peak ratio from images at first and second times. (first embodiment)

FIG. 6 shows for example two images acquired at two times by the first CCD camera 32A. Since the axis of the first CCD camera 32A is inclined relative to the irradiation plane of the laser sheet Ls, the x-y plane of the image is inclined relative to the x-y coordinates of the irradiation plane of the laser sheet Ls. The rectangular frame is one of the test regions formed by dividing the image of the first CCD camera 32A into a grid, and the movement vector within the x-y plane of the group of tracer particles in each test region is calculated. That is, the movement of the luminance pattern of the group of tracer particles in a predetermined test region of the first image acquired at time t1 to the position of the predetermined test region of the second image acquired at time t1' is detected using a cross-correlation value $C(\Delta x, \Delta y)$, and the movement vector is divided by the time Δt, thus giving a two-component velocity vector in the test region. The process of calculating the two-component velocity vector is explained below.

First, the initial values of a first peak value fp and a second peak value sp are both set at 0.

$$fp \leftarrow 0$$

$$sp \leftarrow 0$$

Subsequently, the cross-correlation value $C(\Delta x, \Delta y)$, which is defined by the following equation, is calculated.

$$C(\Delta x, \Delta y) = \sum_{x=p}^{np} \sum_{y=p}^{np} f(x,y) \cdot g(x+\Delta x, y+\Delta y) \qquad \text{[Equation 1]}$$

Here, $f(x, y)$ is a luminance function determined from the luminance pattern of the first image, and $g(x, y)$ is a luminance function determined from the luminance pattern of the second image. Therefore, $g(x+\Delta x, y+\Delta y)$ corresponds to one formed by moving the luminance distribution of $g(x, y)$ in the x-axis direction by $-\Delta x$ and in the y-axis direction by $-\Delta y$. Therefore, $\Delta x$ and $\Delta y$ correspond to the amounts of movement of the luminance pattern during the time interval Δt.

Each test region is a set of n square pixels having a side length of p in the x-axis direction and n square pixels having a side length of p in the y-axis direction, and the cross-correlation value $C(\Delta x, \Delta y)$ is calculated while sweeping $\Delta x$ from p to np and $\Delta y$ from p to np. Each time the cross-correlation value $C(\Delta x, \Delta y)$ exceeds the current first peak value fp, the cross-correlation value $C(\Delta x, \Delta y)$ is defined as a new first peak value fp, and the current first peak value fp is defined as a new second peak value sp.

When the cross-correlation value $C(\Delta x, \Delta y)$ is calculated in this way for all values of $\Delta x$ and $\Delta y$, the values of $\Delta x$ and $\Delta y$ for which the final first peak value fp is obtained are defined as the amounts of movement of the luminance pattern from the first image to the second image. Values obtained by dividing $\Delta x$ and $\Delta y$ by the time interval Δt with which the first and second images are acquired are vx and vy, which are the x component and the y component of the two-component velocity vector in the test region.

In this process, when the degree of correlation between the first image and the second image is high, the first peak value fp becomes outstandingly large and the second peak value sp is much smaller than the first peak value fp, whereas when the degree of correlation between the first image and the second image is low, the difference between the first peak value fp and the second peak value sp becomes small, and in such a case the reliability of a two-component velocity vector determined based on $\Delta x$ and $\Delta y$ becomes low.

In the present embodiment, the peak ratio fp/sp, which is the ratio of the first peak value fp and the second peak value sp, is calculated; if the peak ratio fp/sp is at least a threshold value of 1.2, that is, if the first peak value fp is at least 1.2 times the second peak value sp, it is determined that the reliability of the two-component velocity vector is high, whereas if the first peak value fp is less than 1.2 times the second peak value sp, it is determined that the reliability of the two-component velocity vector is low, and the two-component velocity vector is deleted as an error vector.

Figure 7:
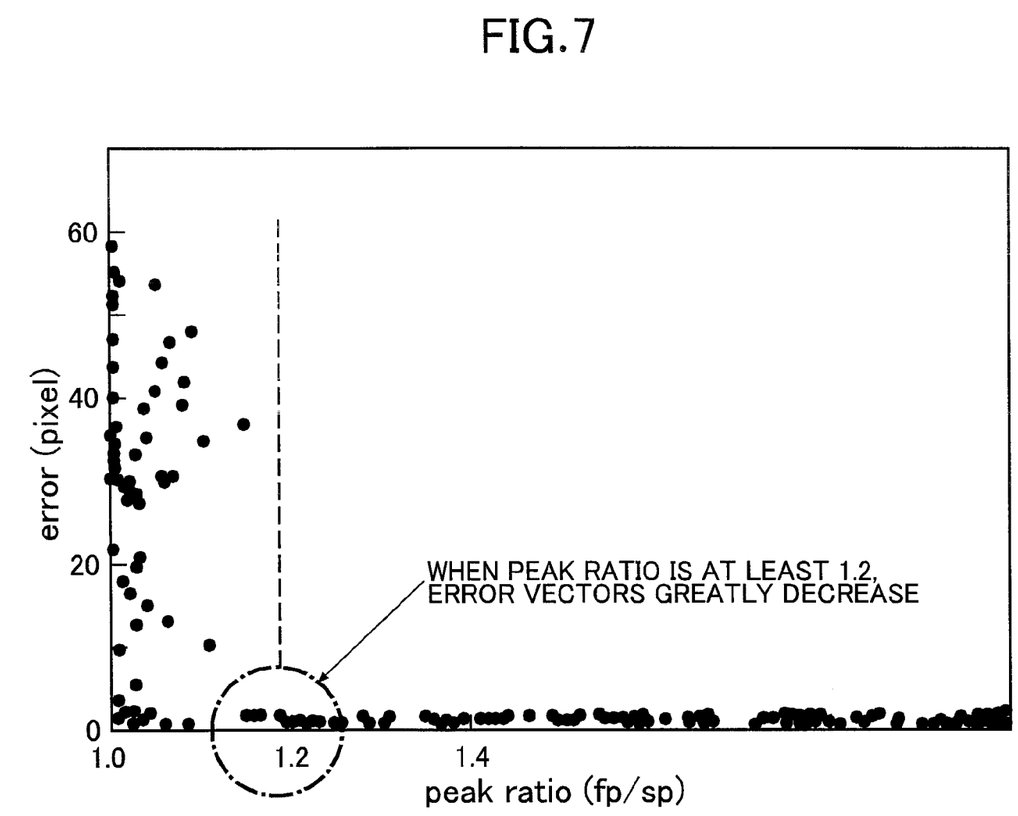
FIG. 7 is a diagram showing the relationship between the ratio of first and second peaks and the number of error vectors. (first embodiment)

The abscissa of FIG. 7 is the peak ratio, and the ordinate is the number of error vectors. It can be seen from this graph that the number of error vectors is very small in the region where the peak ratio is at least 1.2 and the number of error vectors rapidly increases in the region where the peak ratio is less than 1.2.

A method for calculating a two-component velocity vector in each test region from two images acquired at two times t1 and t1' by the first CCD camera 32A is explained above, and in the same manner a three-component velocity vector in each test region may be calculated by comparing two images acquired at the two times t1 and t1' by the second CCD camera 32B.

A two-component velocity vector of a test region obtained from an image of the first CCD camera 32A and a two-component velocity vector of the test region obtained from an image of the second CCD camera 32B are different due to difference in the imaging direction of the first and second CCD cameras 32A and 32B, that is, due to parallax caused by viewing an actual three-component velocity vector from different directions.

Therefore, calibration (correction) using the two two-component velocity vectors and the relative positional relationship between the first and second CCD cameras 32A and 32B relative to the laser sheet Ls can give a three-component velocity vector consisting of in-plane velocities (velocity u in x-axis direction and velocity v in y-axis direction) and an out-of-plane velocity (velocity w in z-axis direction) of the laser sheet Ls so as to correspond to each position of the irradiation plane.

When a three-component velocity vector within the irradiation plane of the laser sheet Ls is calculated as described above, by moving the main traverser 23 and the first and second auxiliary traversers 24A and 24B in the z-axis direction while maintaining a fixed positional relationship, that is, by moving the laser sheet Ls and the first and second CCD cameras 32A and 32B in the z-axis direction while maintaining a fixed positional relationship, an irradiation plane that is displaced in the z-axis direction is irradiated with the laser sheet Ls, and a three-component velocity vector at each position of the new irradiation plane is calculated. In FIG. 1, a state in which an irradiation plane of the particle image velocimetry system 15 is at a position on the object 12 front end (upstream end) side is denoted by a solid line, and a state in which it is at a position on the object 12 rear end (downstream end) side is denoted by a dotted-dashed line.

By stacking in the z-axis direction the results of carrying out this operation for a plurality of irradiation planes spaced in the z-axis direction by a predetermined distance, a three-component velocity vector can be measured for the entirety of the three dimensional space around the object 12, and this enables a velocity field formed around the object 12 to be measured in detail.

Since images of the tracer particles distributed in the irradiation planes are acquired in sequence while moving the position of the laser sheet Ls in the z-axis direction, the times at which the images are acquired vary, but since measurement is carried out by defining the flow around the object as a steady flow, displacement of the time does not become an issue.

If the positions of the first and second CCD cameras 32A and 32B were fixed and only the laser sheet irradiating means 31 were moved in the z-axis direction, the relative positional relationship to the first and second CCD cameras 32A and 32B would change accompanying movement of the laser sheet irradiating means 31, and calibration carried out when a three-component velocity vector was calculated from two two-component velocity vectors obtained from images of the first and second CCD cameras 32A and 32B would vary each time the position of the laser sheet Ls was moved, thereby giving the problem that the number of calibration steps would increase.

However, in accordance with the present embodiment, since the laser sheet irradiating means 31 and the first and second CCD cameras 32A and 32B move in the z-axis direction while maintaining a fixed positional relationship, it becomes unnecessary to carry out calibration each time the position of the laser sheet Ls moves, thus reducing the number of calibration steps.

Figure 8:
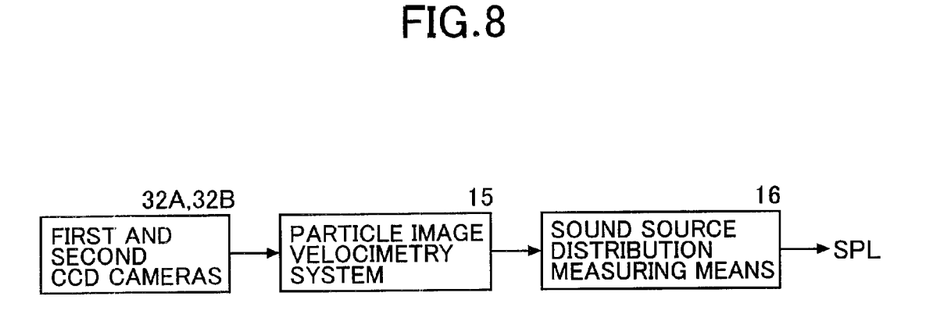
FIG. 8 is a block diagram showing the structure of a device for measuring a sound source distribution. (first embodiment)

As shown in FIG. 8, when the particle image velocimetry system 15 measures a three component velocity vector in three-dimensional space based on images taken by the first and second CCD cameras 32A and 32B, the sound source distribution measuring means 16 measures a sound source distribution in three-dimensional space. The measurement procedure therefor is explained below.

First, a flow turbulence energy k is calculated from the equation below using an average value for the x-axis direction flow velocity $u(x,y,z)$, an average value for the y-axis direction flow velocity $v(x,y,z)$, and an average value for the z-axis direction flow velocity $w(x,y,z)$ of the flow measured by the particle image velocimetry system 15.

$$k=(u'^2+v'^2+w'^2)/2$$

$$u'=u-\bar{u}$$

$$v'=v-\bar{v}$$

$$w'=w-\bar{w} \quad \text{[Equation 2]}$$

Here, u' is a deviation of the x-axis direction flow velocity u relative to the average value for the x-axis direction flow velocity u, v' is a deviation of the y-axis direction flow velocity v relative to the average value for the y-axis direction flow velocity v, and w' is a deviation of the z-axis direction flow velocity w relative to the average value for the z-axis direction flow velocity w.

An average value for a turbulence energy dissipation rate 8 is now calculated using the equation below. Here, the turbulence energy dissipation rate 8 is modeled on the assumption that turbulence has fully developed and attained a steady state, and production and dissipation of turbulence energy are in equilibrium.

$$\bar{\varepsilon} = 2v\overline{s'^2_{jk}} \quad \text{[Equation 3]}$$

$$= -\overline{u'_j u'_k} \frac{\partial \bar{u}_k}{\partial x_j}$$

$$= -\left\{ \begin{array}{l} \overline{u'^2}\frac{\partial \bar{u}}{\partial x} + \overline{u'v'}\frac{\partial \bar{u}}{\partial y} + \overline{w'u'}\frac{\partial \bar{u}}{\partial z} + \overline{u'v'}\frac{\partial \bar{v}}{\partial x} + \overline{v'^2}\frac{\partial \bar{v}}{\partial y} + \\ \overline{w'v'}\frac{\partial \bar{v}}{\partial z} + \overline{w'u'}\frac{\partial \bar{w}}{\partial x} + \overline{w'v'}\frac{\partial \bar{w}}{\partial y} + \overline{w'^2}\frac{\partial \bar{w}}{\partial z} \end{array} \right\}$$

Since turbulence during development satisfies production=diffusion+dissipation, if it is assumed that production=dissipation, there is a possibility of over-evaluating dissipation. Therefore, if it is assumed that dissipation=turbulent diffusion+production, an average value for the turbulence energy dissipation rate ε may be calculated based on the equation below.

$$\bar{\varepsilon} = 2v\overline{s'^2_{jk}} = \frac{\partial}{\partial x_j}\left(-\frac{1}{2}\overline{u'_j u'^2_k}\right) - \overline{u'_j u'_k}\frac{\partial \bar{u}_k}{\partial x_j} \quad \text{[Equation 4]}$$

Furthermore, if it is assumed that dissipation=viscous diffusion+production, an average value for the turbulence energy dissipation rate ε may be calculated based on the equation below.

$$\bar{\varepsilon} = 2v\overline{s'^2_{jk}} = v\frac{\partial^2}{\partial x_j \partial x_k}\overline{u'_j u'_k} - \overline{u'_j u'_k}\frac{\partial \bar{u}_k}{\partial x_j} \quad \text{[Equation 5]}$$

Furthermore, if it is assumed that dissipation=turbulent diffusion+viscous diffusion+production, an average value for the turbulence energy dissipation rate ε may be calculated based on the equation below using a kinematic viscosity coefficient v.

$$\bar{\varepsilon} = 2v\overline{s'^2_{jk}} \quad \text{[Equation 6]}$$

$$= \frac{\partial}{\partial x_j}\left(-\frac{1}{2}\overline{u'_j u'^2_k}\right) + v\frac{\partial^2}{\partial x_j \partial x_k}\overline{u'_j u'_k} - \overline{u'_j u'_k}\frac{\partial \bar{u}_k}{\partial x_j}$$

Moreover, as an approximation method, an average value for the turbulence energy dissipation rate ε may be calculated based on the equation below.

$$\bar{\varepsilon} = 2v\overline{s'_{jk}}^2$$ [Equation 7]

$$\approx \frac{\partial}{\partial x_j}\left\{-\bar{u}_j\bar{k} - \frac{1}{2}\overline{u'_ju'^2_k} + v\left(\frac{\partial \bar{k}}{\partial x_j} + \frac{\partial}{\partial x_k}\overline{u'_ju'_k}\right)\right\} - \overline{u'_ju'_k}\frac{\partial \bar{u}_k}{\partial x_j}$$

Furthermore, an average value for the turbulence energy dissipation rate ε may be calculated based on the equation below.

$$\bar{\varepsilon} = v\Big[2\{(\partial \bar{u}/\partial x)^2 + (\partial \bar{v}/\partial y)^2 + (\partial \bar{w}/\partial z)^2\} +$$ [Equation 8]

$$(\partial \bar{v}/\partial x + \partial \bar{u}/\partial x)^2 + (\partial \bar{w}/\partial y + \partial \bar{v}/\partial z)^2 +$$

$$(\partial \bar{u}/\partial z + \partial \bar{w}/\partial x)^2 -$$

$$\frac{2}{3}(\partial \bar{u}/\partial x + \partial \bar{v}/\partial y + \partial \bar{w}/\partial z)^2\Big]$$

v: kinematic viscosity coefficient

Subsequently, a sound pressure of the flow is calculated using the Proudman theorem. First, an acoustic power $P_A$ is calculated based on the equation below.

$$P_A = \alpha_\varepsilon \cdot \rho_0 \cdot \bar{\varepsilon} \cdot M_t^5 = \alpha_\varepsilon \cdot \rho_0 \cdot \bar{\varepsilon} \cdot \left(\frac{\sqrt{2k}}{a_0}\right)^5$$ [Equation 9]

$\alpha_\varepsilon$: scale constant, $\rho_0$: reference density,
$M_t$: turbulence Mach number, $a_0$: reference sound velocity
Here, $\alpha_\varepsilon$ is a scale constant, $\rho_0$ is a reference density, $M_t$ is a turbulence Mach number, $a_0$ is a reference sound velocity, and k is the turbulence energy k above.

A sound pressure SPL(x, y, z) is calculated from the equation below using the acoustic power $P_A$ and the reference acoustic power $P_{ref}$.

$$SPL = 10\log\left(\frac{P_A}{P_{ref}}\right)$$ [Equation 10]

$P_{ref}$: reference acoustic power

The sound pressure SPL(x, y, z) thus calculated is a function of x, y, and z, and a sound source distribution at a given position in the flow field can be obtained by calculating this sound pressure SPL(x, y, z), thereby making it possible to appropriately understand how much noise is coming from which part of the three-dimensional object 12 disposed in the three-dimensional flow field.

An embodiment of the present invention is explained above, but the present invention may be modified in a variety of ways as long as the modifications do not depart from the spirit and scope thereof.

For example, the structure of the particle image velocimetry system of the present invention is not limited to the embodiment, and any structure may be employed as long as three velocity components in three-dimensional space can be determined.

Moreover, in the embodiment the laser sheet irradiating means 31 is supported on the main traverser 23 and the first and second CCD cameras 32A and 32B are supported on the first and second auxiliary traversers 24A and 24B respectively, but the laser sheet irradiating means 31 and the first and second CCD cameras 32A and 32B may be supported on a common traverser.

Furthermore, the drive means for the traverser is not limited to the drive sprocket 26, the driven sprocket 27, and the timing belt 28, and any means such as a rack-and-pinion mechanism or a pole screw mechanism may be employed.

Moreover, the direction of the laser beam emitted from the laser head 30 may be changed via an optical system such as a mirror for finely adjusting the optical axis and then emitted parallel to the guide members 21 and 22.

The invention claimed is:

1. A device for measuring a sound source distribution in three-dimensional space, the device comprising:
    a particle image velocimetry system that irradiates, with laser light, tracer particles included in a flow field around an object at two times that are separated by a short time interval, and measures a velocity field of three velocity components in three-dimensional space from images at the two times of the tracer particles irradiated with the laser light taken by an imaging device; and
    sound source distribution measuring device that measures a sound source distribution around the object from the velocity field of the three three-dimensional velocity components,
    wherein the particle image velocimetry system irradiates tracer particles in the flow field with a two-dimensional laser sheet, obtains the three velocity components within a plurality of planes while moving the laser sheet, and measures the velocity field by stacking the three velocity components within the plurality of planes with the flow as a steady flow, and
    wherein the particle image velocimetry system comprises laser sheet irradiating device and the imaging device supported on a moving member that can be moved along a guide member disposed in a direction parallel to a laser beam that forms the laser sheet, the laser sheet irradiating device and the imaging device being moved while maintaining a fixed positional relationship.

2. The device for measuring a sound source distribution in three-dimensional space according to claim 1, wherein
    the sound source distribution measuring device measures a sound source distribution around the object from the velocity field of the three three-dimensional velocity components based on the Proudman theorem.

3. The device for measuring a sound source distribution in three-dimensional space according to claim 1, wherein the imaging device takes images at the two times of the tracer particles irradiated with the laser light from two intersecting directions.

4. The device for measuring a sound source distribution in three-dimensional space according to claim 3, wherein the particle image velocimetry system irradiates tracer particles in the flow field with a two-dimensional laser sheet, wherein the imaging device takes images at the two times of the tracer particles irradiated with the laser light from two intersecting directions in the two-dimensional laser sheet.

* * * * *